(12) United States Patent
Chandler et al.

(10) Patent No.: US 10,738,576 B2
(45) Date of Patent: Aug. 11, 2020

(54) UTILIZING MICROFLUIDICS AS A RAPID SCREENING TECHNOLOGY FOR ENHANCED OIL RECOVERY

(71) Applicants: Brett D. Chandler, Calgary (CA); Jihye Kim, Sugar Land, TX (US); Eric Willmott, Houston, TX (US)

(72) Inventors: Brett D. Chandler, Calgary (CA); Jihye Kim, Sugar Land, TX (US); Eric Willmott, Houston, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 0 days.

(21) Appl. No.: 16/247,866

(22) Filed: Jan. 15, 2019

(65) Prior Publication Data

US 2019/0218897 A1 Jul. 18, 2019

Related U.S. Application Data

(60) Provisional application No. 62/617,474, filed on Jan. 15, 2018.

(51) Int. Cl.
| | |
|---|---|
| *E21B 43/16* | (2006.01) |
| *C09K 8/588* | (2006.01) |
| *C10G 1/04* | (2006.01) |
| *C09K 8/584* | (2006.01) |

(52) U.S. Cl.
CPC .............. *E21B 43/16* (2013.01); *C09K 8/584* (2013.01); *C09K 8/588* (2013.01); *C10G 1/04* (2013.01)

(58) Field of Classification Search
CPC .......... E21B 43/16; C09K 8/584; C09K 8/588; C10G 1/04
See application file for complete search history.

(56) References Cited

U.S. PATENT DOCUMENTS

| | | |
|---|---|---|
| 6,132,685 A | 10/2000 | Kercso et al. |
| 6,309,600 B1 | 10/2001 | Hunter |
| 6,846,638 B2 | 1/2005 | Shipwash |

(Continued)

FOREIGN PATENT DOCUMENTS

| | | |
|---|---|---|
| EP | 2416152 A1 | 3/2012 |
| WO | 0170400 A1 | 9/2001 |

(Continued)

OTHER PUBLICATIONS

Mao, P. et al. (2005) Lab Chip, 5, 837-844.*

(Continued)

*Primary Examiner* — Brian A Mccaig
(74) *Attorney, Agent, or Firm* — Cantor Colburn LLP

(57) ABSTRACT

A method of screening a plurality of fluids for an effectiveness in enhancing oil recovery comprises introducing a petroleum hydrocarbon into a plurality of separate fluid channels to saturate the fluid channels, each of the fluid channels having a porous structure configured to represent a condition of an earth formation; injecting a plurality of aqueous based fluids into the fluid channels; imaging the fluid channels to provide a plurality of images; analyzing the images to determine amounts of the petroleum hydrocarbon remain in the fluid channels after injection of the aqueous based fluids; and determining an effectiveness of the aqueous based fluids in forcing the petroleum hydrocarbon out of the fluid channels.

16 Claims, 5 Drawing Sheets

(56) References Cited

U.S. PATENT DOCUMENTS

| | | |
|---|---|---|
| 7,305,306 B2 | 12/2007 | Venkataramanan et al. |
| 7,575,681 B2 | 8/2009 | Angelescu et al. |
| 7,691,333 B2 | 4/2010 | McBride et al. |
| 7,695,629 B2 | 4/2010 | Salamitou et al. |
| 7,723,120 B2 | 5/2010 | Xiao et al. |
| 7,767,447 B2 | 8/2010 | Breidenthal et al. |
| 7,788,972 B2 | 9/2010 | Terabayashi et al. |
| 8,003,063 B2 | 8/2011 | Guan et al. |
| 8,262,909 B2 | 9/2012 | Angelescu et al. |
| 8,306,751 B2 | 11/2012 | Rickman |
| 8,323,466 B2 | 12/2012 | Kim et al. |
| 8,508,741 B2 | 8/2013 | Kumar |
| 8,564,768 B2 | 10/2013 | Harrison et al. |
| 9,126,127 B2 | 9/2015 | Jablonski et al. |
| 9,341,059 B2 | 5/2016 | Harrison et al. |
| 2006/0160206 A1 | 7/2006 | Holmquist et al. |
| 2009/0120168 A1 | 5/2009 | Harrison et al. |
| 2009/0183871 A1 | 7/2009 | Salamitou et al. |
| 2009/0185955 A1 | 7/2009 | Nellissen |
| 2010/0012586 A1 | 1/2010 | Angelescu et al. |
| 2010/0017135 A1 | 1/2010 | Mostowfi |
| 2010/0140110 A1 | 6/2010 | Kim et al. |
| 2010/0147065 A1 | 6/2010 | Tan et al. |
| 2010/0265492 A1 | 10/2010 | Schroeder et al. |
| 2010/0268469 A1 | 10/2010 | Harrison et al. |
| 2010/0269579 A1 | 10/2010 | Lawrence et al. |
| 2011/0112773 A1 | 5/2011 | Atkinson |
| 2012/0169334 A1 | 7/2012 | Hopper et al. |
| 2016/0123890 A1* | 5/2016 | He .................. G01N 21/05 73/53.01 |

FOREIGN PATENT DOCUMENTS

| | | |
|---|---|---|
| WO | 2014171947 A2 | 10/2014 |
| WO | 20140158376 A1 | 10/2014 |

OTHER PUBLICATIONS

Berejnov, et al.; "Lab on Chip Methodologies for the Study of Transport in Porous Media: Energy Applications"; 2008; Lab on a Chip; vol. 8; Issue 5; The Royal Society of Chemistry; 5 pages.

Dehaas et al.; "Steam on a Chip for Oil Recovery: The Role of Alkaline Additives in Steam Assisted Gravity Drainage"; Oct. 2013; Lab on a Chip; vol. 13; Issue 19; The Royal Society of Chemistry; 9 pages.

Gunda, et al.; "Reservoir on a Chip (ROC): A New Paradigm in Reservoir Engineering"; 2011; Lab on a Chip; vol. 11; Issue 22; The Royal Society of Chemistry; 9 pages.

Guo et al.; "An Experimental Investigation of Nanoparticle-Stabilized CO2 Foam Used in Enhanced Oil Recovery"; Fuel 186; 2016; Elsevier Ltd.; 13 pages.

IOR 2019 20th European Symposium on Improved Oil Recovery; Apr. 8-11, 2019, Pau, France; 17 pages.

Lee, et al.; "Photopatterned Oil-Reservoir Micromodels with Tailored Wetting Properties"; 2015; Lab on a Chip vol. 15; Issue 14; The Royal Society of Chemistry; 9 Pages.

Lele, et al.; "Development of a Microfluidic Device for Rapid Assessment of EOR Additives"; SPE-170156-MS; SPE Heavy Oil Conference, Alberta, Canada; Jun. 10-12, 2014; 4 pages.

Lifton; "Microfluidics: an Enabling Screening Technology for Enhanced Oil Recovery (EOR)"; Lab on a Chip; Royal Society of Chemistry; vol. 16; 2016; 20 pages.

Porter, et al.; "Geo-Material Microfluidics at Reservoir Conditions for Subsurface Energy Resource Applications"; 2015; Lab Chip; vol. 15; Issue 20; The Royal Society of Chemistry; 10 pages.

Quennouz, "Microfluidic Study of Foams Flow for Enhanced Oil Recovery (EOR)"; Oil & Gas Science Technology—Rev. IFP Energies Nouvelles, 2014; vol. 69, No. 3, 11 pages.

Song, et al.; "Chip Off the Old Rock: The Study of Reservoir Relevant Geological Processes with Real-Rock Micromodels";2014; Lab on a Chip; vol. 14; Issue 22; The Royal Society of Chemistry; 9 pages.

Song, et al.; "Functionalization of Micromodels with Kaolinite for Investigation of Low Salinity Oil Recovery Processes"; 2015; Lab on a Chip; vol. 15; Issue 16; The Royal Society of Chemistry; 12 pages.

Xu, et al.; "Microfluidic Investigation of Nanoparticles Role in Mobilizing Trapped Oil Droplets in Porous Media";2015: Langmuir vol. 31 Issue 51; ACS Publications; 7 pages.

Zhong,et al.;"Automatic Extraction and Processing of Small RNAs on Multi-Well/Multi-Channel (M & M) Chip"; 2012; Analyst; Colume 137; Issue 23; The Royal Society of Chemistry; 7 pages.

* cited by examiner

UTILIZING MICROFLUIDICS AS A RAPID SCREENING TECHNOLOGY FOR ENHANCED OIL RECOVERY

CROSS REFERENCE TO RELATED APPLICATIONS

This application claims the benefit of an earlier filing date from U.S. Provisional Application Ser. No. 62/617,474, filed Jan. 15, 2018, the entire disclosure of which is incorporated herein by reference.

BACKGROUND

Crude oil recovery can include several stages. During the primary recovery stage, the natural pressure of the reservoir drives oil into the wellbore and up to the surface. As the reservoir pressure declines because of production, an artificial lift system is normally implemented. Production using artificial lift is also considered primary recovery. When primary recovery stage reaches its limit, water or gas can be injected to displace oil and drive it to a production wellbore during secondary or tertiary recovery.

During any stage of reservoir production, enhanced oil recovery (EOR) techniques can be used to increase the amount of crude oil that can be extracted from the reservoir. There are several techniques for EOR—chemical injection is one of them. Chemical techniques inject surfactants (surfactant flooding) to reduce the interfacial tension that prevents or inhibits oil droplets from moving through a reservoir or inject polymers that allow the oil present in the formation to more easily mobilize through the formation.

Chemical EOR requires optimization for maximum effect. The optimal selection of surfactants and/or polymers depends on reservoir crude oil chemistry, temperature, pressure, permeability, residual oil composition, fluid properties and the like. Traditional methods to evaluate the effectiveness of chemicals to enhance oil production include sand pack and core flood tests. While these methods are beneficial testing tools, they can be labor intensive and time consuming. Accordingly, the art would be receptive to alternative methods that are effective to rapidly screening chemicals to enhance oil recovery.

SUMMARY

A method of screening a plurality of fluids for an effectiveness in enhancing oil recovery comprises introducing a petroleum hydrocarbon into a plurality of separate fluid channels to saturate the fluid channels, each of the fluid channels having a porous structure configured to represent a condition of an earth formation; injecting a plurality of aqueous based fluids into the fluid channels; imaging the fluid channels to provide a plurality of images; analyzing the images to determine an amount of the petroleum hydrocarbon remains in the fluid channels after injection of the aqueous based fluids; and determining an effectiveness of the aqueous based fluids in forcing the petroleum hydrocarbon out of the fluid channels.

A system for screening a plurality of fluids for an effectiveness in enhancing oil recovery comprises a plurality of separate fluid channels, each of the fluid channels having a porous structure configured to represent a condition of an earth formation, and each of the fluid channels having a separate inlet and outlet; at least one injection device configured to inject a plurality of fluids into the fluid channels; at least one back pressure regulator coupled to the fluid channels; at least one imaging device configured to image the fluid channels; and a processing unit configured to determine an amount of the fluids in the fluid channels based on the images.

BRIEF DESCRIPTION OF THE DRAWINGS

The following descriptions should not be considered limiting in any way. With reference to the accompanying drawings, like elements are numbered alike.

DETAILED DESCRIPTION

High throughput systems and methods are provided for screening fluids, particularly aqueous based fluids containing surfactants and/or polymers, for enhancing oil recovery. The systems and methods use a plurality of separate fluid channels to mimic reservoir conditions and can test multiple samples simultaneously thus reducing the amount of the samples required for testing and the time to screen the samples.

The microfluidic system disclosed herein can differentiate oil recovery performance among good, average, and poor performing surfactants/polymers. A systematic study shows that the microfluidic technique gives higher data resolution to differentiate surfactant/polymer performance than sandpack method and provides reasonable repeatability when wettability is controlled.

Furthermore, the details of oil recovery process inside the fluid channels through the interaction between oil and surfactant/polymer as well as the formation of microemulsion can be vividly exhibited in a transparent microfluidic reservoir, which is not possible with conventional testing methods. The quantified oil recovery data is similar to those of conventional sandpack and core flood tests, but obtained faster by a few days up to a few weeks with less operational difficulty.

Figure 1:
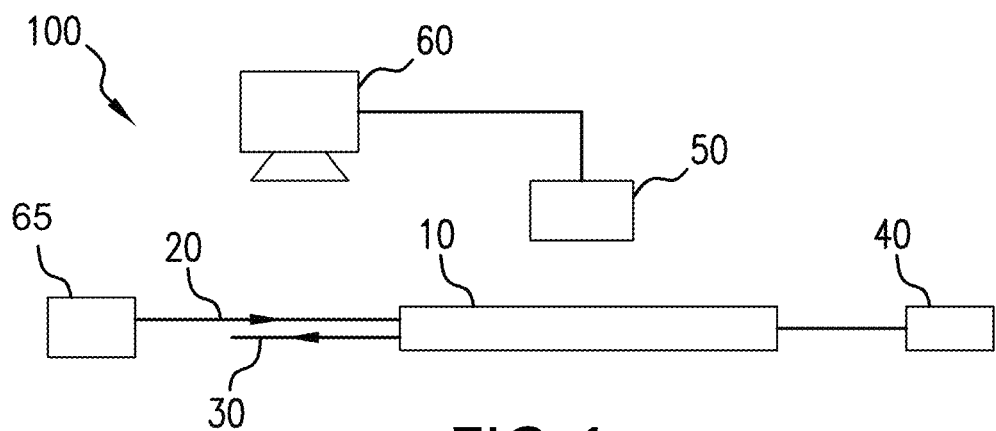
FIG. 1 depicts an exemplary system for screening chemicals to enhance oil recovery using microscale fluid channels.
Figure 2:
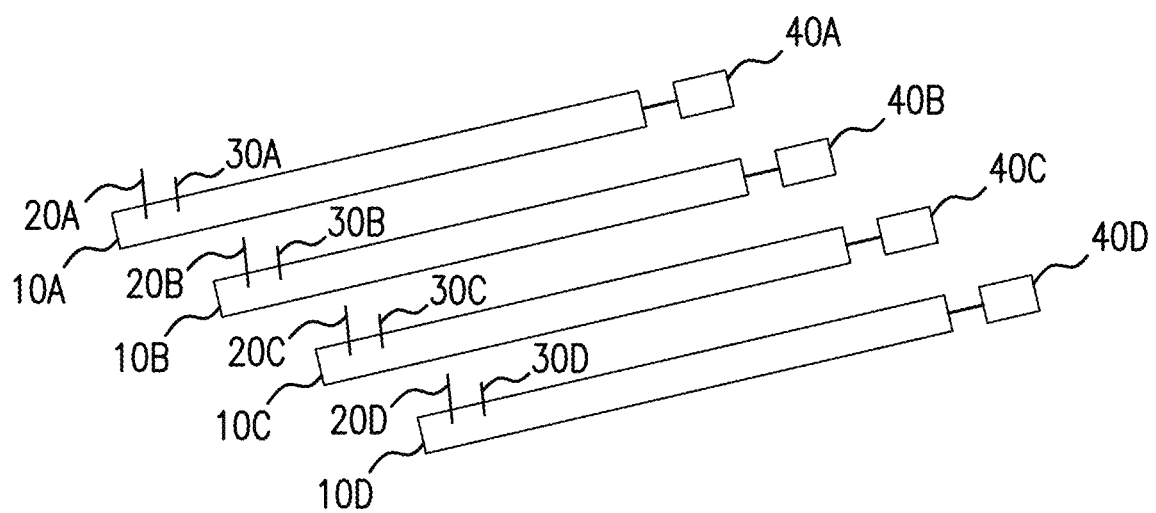
FIG. 2 depicts an exemplary arrangement of a plurality of separate microscale fluid channels in the system of FIG. 1.

Referring to FIGS. 1 and 2, an exemplary system for screening fluids to enhance oil recovery is shown. The system (100) includes a plurality of separate fluid channels (10, 10A-10D), at least one injection device (65) such as a syringe pump configured to inject a plurality of fluids into the fluid channels; at least one back pressure regulator (40, 40A-40D) coupled to the fluid channels; at least one imaging device (50) configured to image the fluid channels; and a processing unit (60) configured to determine the amount of the fluids in each of the fluid channels based on the images. The system can also include a source of the plurality of fluids coupled to the fluid channels. Optionally the system also include pressure sensors (not shown) coupled to the fluid channels.

The fluid channels are fabricated on substrates using lithographic techniques such as chemical etching. The plurality of separate fluid channels can be arranged in a parallel manner as shown in FIG. 2. Each of the fluid channels can be coupled to a separate back pressure regulator. The back pressure can be set at about 40 psi to about 120 psi, or about 50 psi to about 100 psi to allow for better contact between oil and the aqueous phase insider the fluid channels. In an embodiment, each of the fluid channels has the same porous structure. Alternatively the fluid channels have different porous structures.

The fluid channels together with the substrates can be disposed in a housing. The housing includes a base and a plurality of cavities, where each of the cavities can hold a substrate having a fluid channel fabricated thereon. A cover can be disposed on the housing to provide protection to the fluid channels. In an embodiment, the base is a metal part, and the housing can be a hotplate adaptor. The housing can be placed on a hotplate so that the fluids in the fluid channels can be heated to a desired temperature. Other means can also be used to control the temperature of the fluids in the fluid channels.

Each of the fluid channels has an inlet (20, 20A-20D) for introducing fluids into the fluid channels and an outlet (30, 30A-30D) for delivering the fluids out of the fluid channels. The inlets and outlets can be located at the same side of the fluid channels. Alternatively, the inlets and the outlets are positioned at different ends of the fluid channels.

Each of the plurality of fluid channels includes porous structures that mimic reservoir conditions such as pore and pore throat size, porosity, reservoir pore structure, permeability, water- or oil-wet wettability, and polarity. In an embodiment, the fluid channels are microscale channels having at least one cross-sectional channel dimension of about 1 micron to about 500 microns, about 10 microns to about 400 microns, or about 40 microns to about 300 microns. Optionally each of the fluid channels has a pore volume of about 10 micro liters to about 200 micro liters, about 20 micro liters to about 100 micro liters, or about 25 micro liters to about 80 micro liters. The permeability and porosity of the fluid channels can vary greatly. For example, the fluid channels can have a permeability of about 0.1 to about 5 Darcy units, about 0.5 to about 4 Darcy units, or about 1 to about 3 Darcy units and a porosity of about 40% to about 85%, about 50% to about 75%, or about 60% to about 70%.

To facilitate the imaging of the fluid channels, the channels are made of a transparent material such as glass. The surface of the fluid channels can be treated to provide the desired surface properties. In an embodiment, the fluid channels have hydrophilic surface wettability.

The fluid channels can withstand high pressure and high temperature conditions. In an embodiment, the fluid channels are stable at a temperature up to about 300° C., about 250° C. or about 100° C. and a pressure of up to about 2,000 psi, about 1,500 psi or about 500 psi.

The imaging device (50) such as a camera is configured to take still images and/or video, which can be transmitted to a processing unit (60). In an embodiment, each of the fluid channels are associated with a microscope camera, which is configured to take separate images and/or videos for each fluid channels. The distribution of the fluids in the fluid channels can be visualized in real time.

The processing unit (60) includes a processor and a memory and stores one or more processing modules or programs for processing images, determining areas/volumes of different fluids in the channels and/or evaluating fluid behavior. The processing unit (60) may also perform other functions, such as controlling fluid injection parameters (e.g., fluid type, pressure and flow rate through the channel) and timing of injection of different fluids. The processing unit (60) may also be configured to provide experimental results and other data to a user and/or other device. For example, the data can be transmitted to an operator or control device for purposes of planning stimulation or other operations and/or controlling operational parameters of such operations.

The system as disclosed herein can screen a plurality of fluids for an effectiveness in enhancing oil recovery at the same time. A high throughput screening method for enhancing oil recovery comprises introducing a petroleum hydrocarbon into a plurality of separate fluid channels to saturate the fluid channels; injecting a plurality of aqueous based fluids into the fluid channels; imaging the fluid channels to provide a plurality of images; analyzing the images to determine an amount of the petroleum hydrocarbon remains in the fluid channels after injection of the aqueous based fluids; and determining an effectiveness of the aqueous based fluids in forcing the petroleum hydrocarbon out of the fluid channels.

The method provides rapid screening that uses small volumes of chemicals to conduct a large number of testing in order to determine the optimal composition to enhance oil production. Additionally, the interaction of each chemicals such as surfactants with oil inside the channels can be visually observed in real time, which is not possible with conventional methods.

As used herein, petroleum hydrocarbon includes crude oil, natural gas condensate, shale oil, shale gas condensate, bitumen, diluted bitumen (dil-bit), and the like. Petroleum hydrocarbon fluids can further contain water, brines, gases such as hydrocarbon gases, or a combination comprising at least one of the foregoing. Crude oil is specifically mentioned.

"Saturated with petroleum hydrocarbon" means filled with petroleum hydrocarbon fluids. The petroleum hydrocarbon in the fluid channels can be aged at an elevated temperature such as about 100° F. to about 350° F. for an extended period of time, for example about 5 hours to about 36 hours, about 5 hours to about 20 hours, or about 8 hours to about 15 hours. A pressure can be applied during the aging to mimic reservoir conditions. A pressure of about 50 psi to up to about 3,000 psi, about 200 psi to about 2,000 psi, or about 300 psi to about 1,700 psi may be applied if needed. In an embodiment, the petroleum hydrocarbon in each of the fluid channels is the same. In another embodiment, the petroleum hydrocarbons in the fluid channels are different by having one or more of the following different information: an acid number; a viscosity; a density; an alkane carbon number, or a composition of the crude oil.

After the petroleum hydrocarbon in the fluid channels are aged, optionally, water or brine is injected into the fluid channels first to simulate water/brine flooding. The fluid channels are imaged. The amount of residual petroleum hydrocarbon can be calculated based on the images. When water or brine does not further improve the oil recovery rate, a plurality of fluids can be injected into the fluid channels to evaluate the effectiveness of these fluids to further enhance oil production.

The fluids to be tested for flooding effectiveness can be aqueous based fluids containing an active component such as a surfactant, a polymer, or other additives that may improve the effectiveness of the fluids in enhancing oil recovery. Surfactants are used to reduce the interfacial tension to solubilize oil from a reservoir. Polymers allow the oil present in the formation to more easily mobilize through the formation. Any chemicals that may function as surfactants or polymers for the intended purposes as described herein may be screened. The aqueous based fluids can further include a co-surfactant, an organic solvent, a co-solvent, a diluent, or a combination comprising at least one of the foregoing. Injecting the aqueous based fluids into the fluid channels includes injecting a different aqueous based fluid into each of the plurality of the fluid channels. At least one variable of the aqueous based fluids can change across the plurality of the aqueous based fluids. The variable includes a concentration of an active component, a composition of injection brine, an injection volume of the aqueous based fluids, or a flow rate of the aqueous based fluids. The active component itself in the plurality of the aqueous fluids can also be changed. Optionally additional water or brine is injected after the surfactant/polymer flooding. The progression of oil recovery throughout the process can be video recorded for visual assessment of the active component performance. The percent of oil recovery, emulsion size, and pore dynamics can be analyzed via optical image analysis by the process unit.

The concept of chemical performance indication can be used to account for slight data variation in repeat curves with the same chemicals to fairly evaluate them. This variation between similar tests has also been observed previously with conventional testing.

A calculative indicator for chemical effectiveness is shown in the equation below taking into consideration of the amount of residual oil after initial water flooding and the total oil recovery from each test:

[Chemical performance effectiveness (%)]=[FOR−IOR]/[MOR−IOR]×100, wherein FOR is the final oil recovery %, IOR is the initial oil recovery % from initial water or brine flooding, MOR is Max oil recovery expected. MOR can be about 70% to about 90% or about 75% to about 85% or about 80%.

Using this indicator, interpretation of chemical performance is clearer in spite of the differences in the amounts of the original residual oil in the fluid channels after water flooding.

The methods disclosed herein can be used for both pilot and field simulations. The injection patterns can be varied to evaluate the effects of active component concentration and injection time (contact time) on oil recovery.

The high throughput method allows multiple tests to be conducted simultaneously. In an embodiment, the method allows at least four, at least five, at least six, or at least six tests to be conducted simultaneously.

Identifying the best EOR surfactant formulations includes reducing interfacial tension and maximizing oil recovery. The high throughput screening methods as disclosed herein can be used to build a library of chemical and structural relationships of surfactant formulations and crude oil. The methods can also be used to better characterize the impact of temperature and pressure on oil recovery.

EXAMPLES

The screening system used in the examples included a microfluidic porous media that resembled sandstone reservoir in terms of reservoir pore structure, water-wet wettability, and polarity. The porous media had a pore volume of about 40 micro litter, a permeability of 1.6 Darcy, and a porosity of about 65%.

Figure 3:
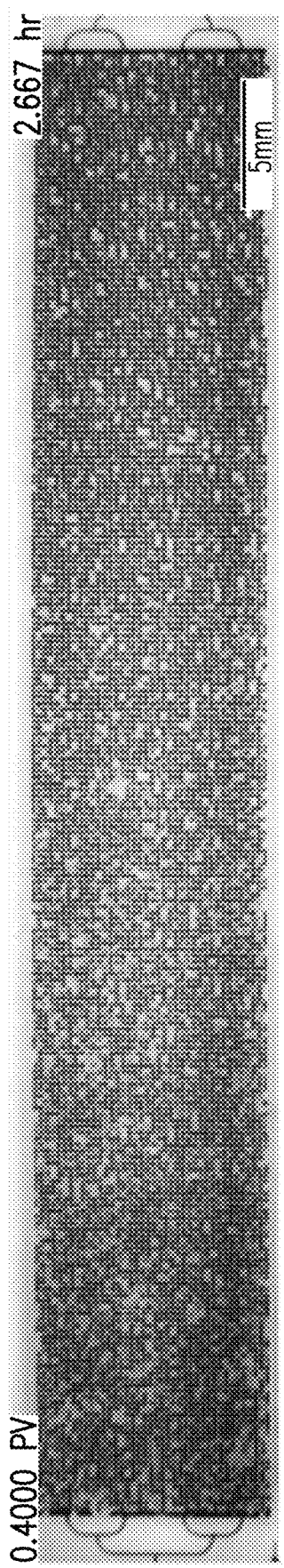
FIG. 3 is an image of a microscale fluid channel saturated with a crude oil.

The porous media was pretreated with acetone and deionized water. Then the porous media was saturated with brine, and then filled with a light crude oil. The saturated oil was aged overnight at 65° C. and 90 psi. An image of the microfluidic porous media saturated with the crude oil is shown in FIG. 3.

Figure 4:
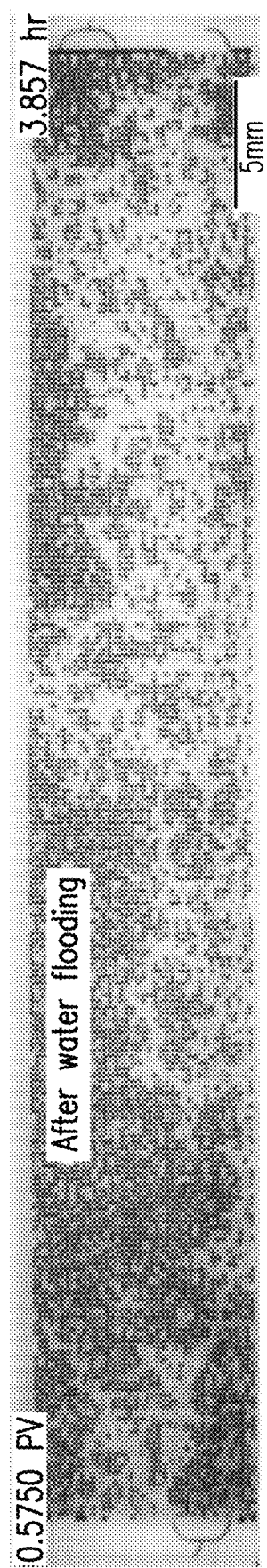
FIG. 4 is an image of the microscale fluid channel of FIG. 3 after brine flooding.
Figure 5:
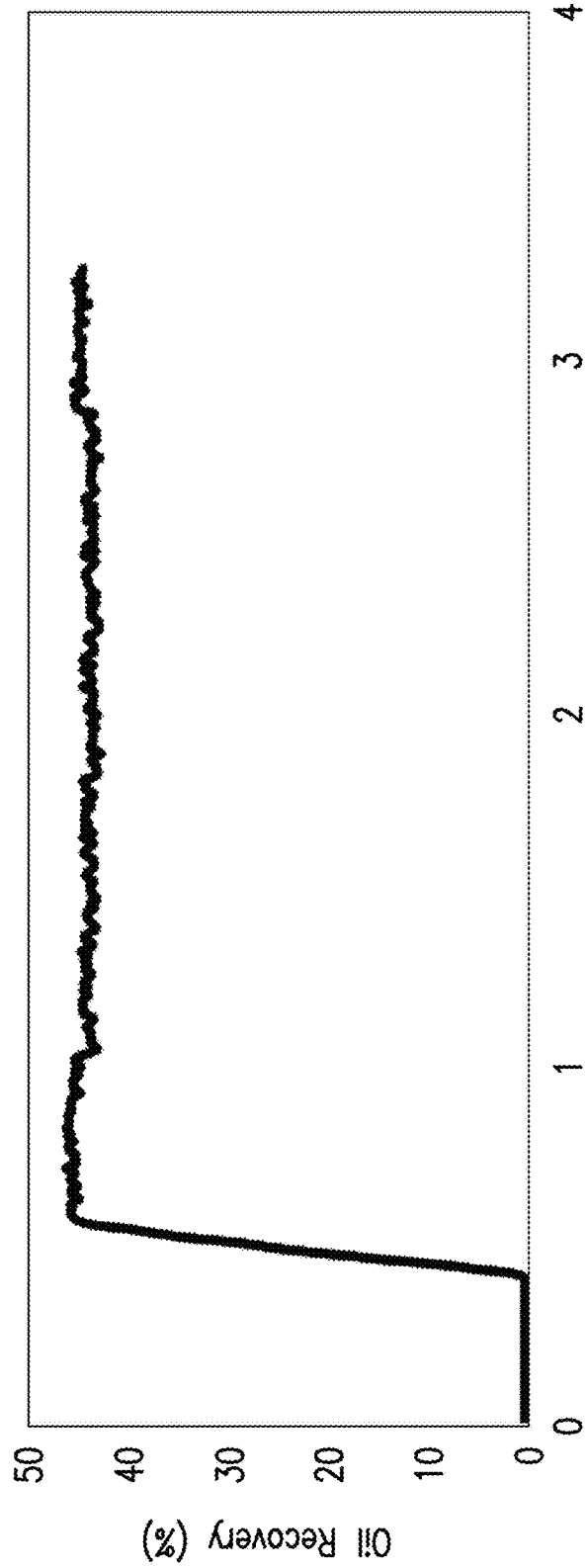
FIG. 5 is a graph showing the oil recovery percent as a function of the volume of brine injected into the fluid channel.

Next, brine was injected into the porous media to simulate secondary recovery water flooding. The progression of oil recovery was filmed/imaged using an USB microscope camera. FIG. 4 is an image of the microfluidic porous media after water flooding taken by the microscope camera. The images were analyzed to quantify the oil recovery with respect to pore volume of the injected water. Oil recovery as a percentage of pore volume was plotted against the volume of the injected water. FIG. 5 is a graph showing the oil recovery percent as a function of the volume of water injected into the microfluidic porous media.

Figure 6:
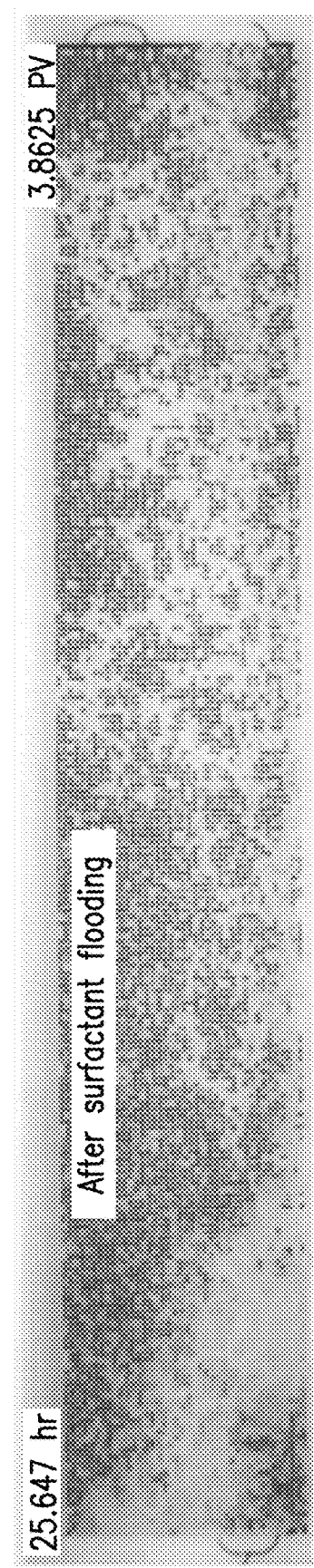
FIG. 6 is an image of the microscale fluid channel of FIG. 4 after additional surfactant flooding.
Figure 7:
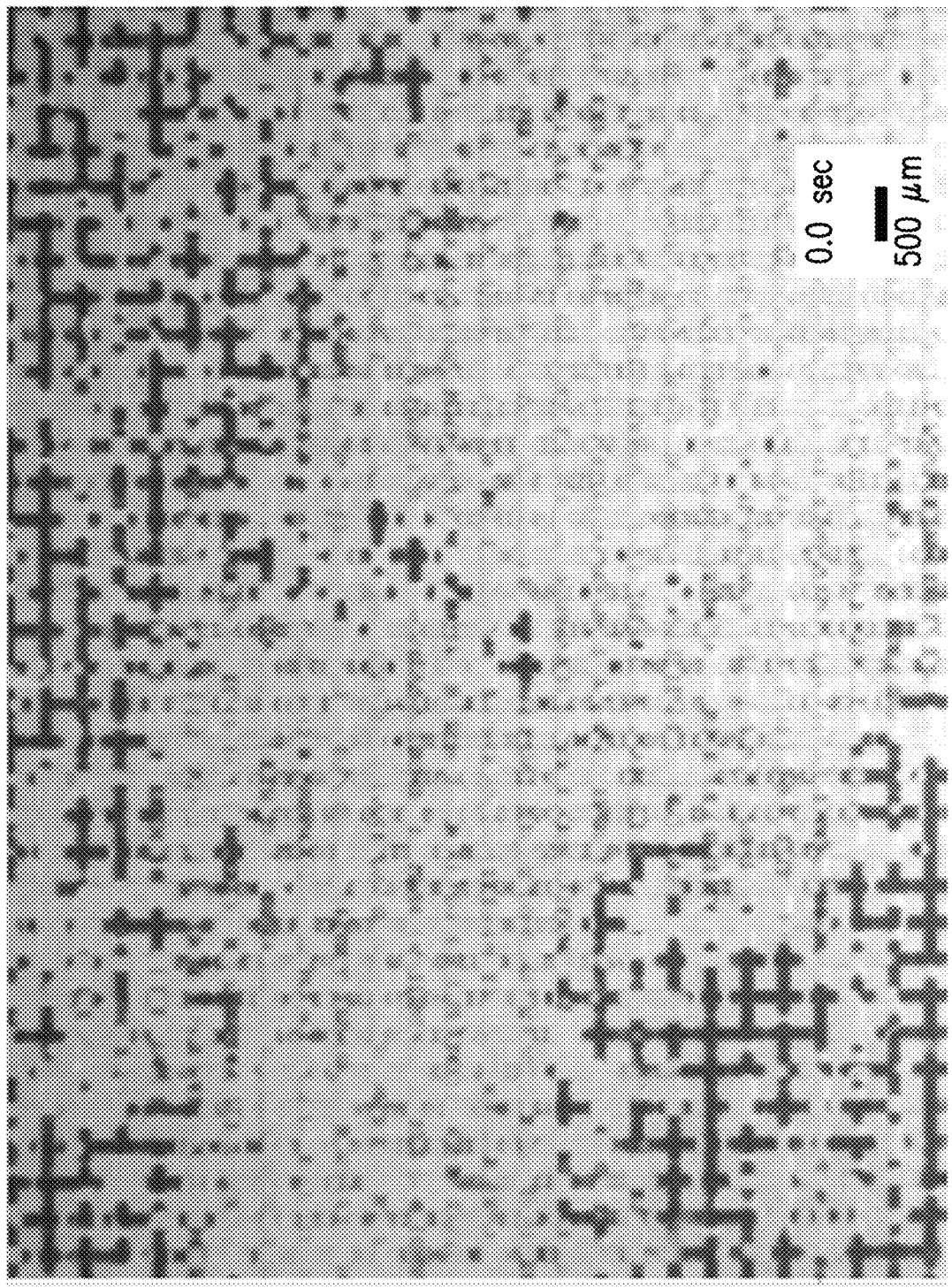
FIG. 7 is an image of the microscale fluid channel showing the formation of emulsions that solubilized crude oil during surfactant flooding.

For the residual oil left behind, a simulated surfactant-containing fluid was injected, followed by additional water injection. The progression of oil recovery again was filmed/imaged using an USB microscope camera. FIG. 6 is an image of the microfluidic porous media after additional surfactant flooding. By simply zooming in with high magnification on the USB microscope camera, the detail of oil-surfactant interface inside the porous media is visible during the oil recovery process. FIG. 7 is an image of the microfluidic porous media showing the formation of microemulsions that solubilized crude oil during surfactant flooding and produced oil.

Figure 8:
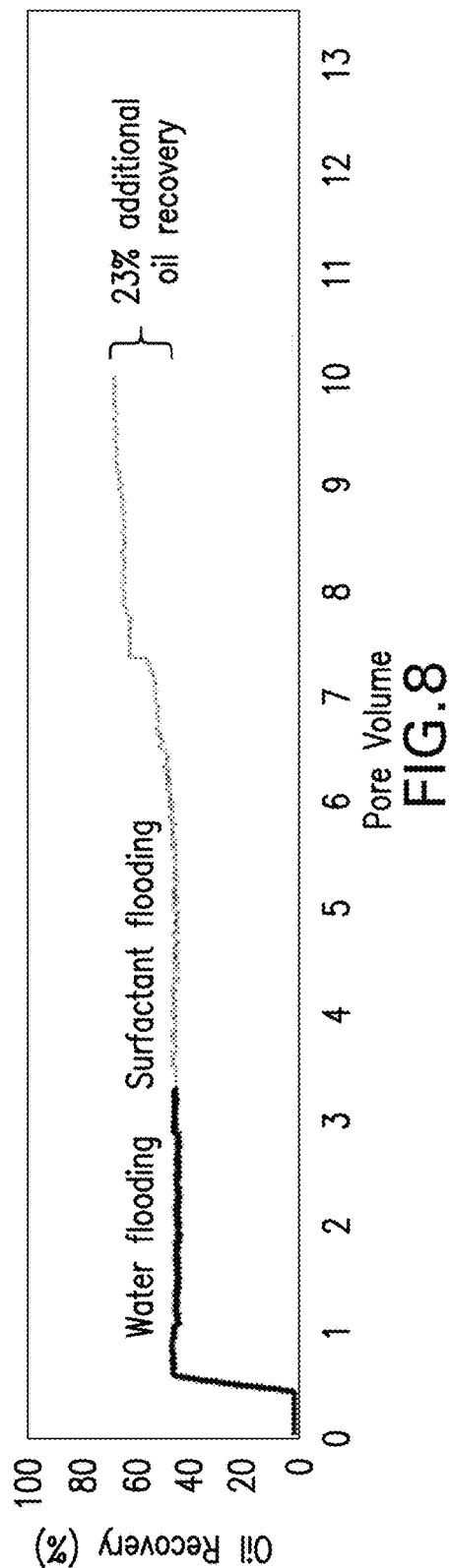
FIG. 8 is a graph showing the oil recovery percent as a function of brine flooring and surfactant flooding volume.

The images were analyzed to quantify the oil recovery with respect to pore volume of the injected surfactant-containing fluids. Oil recovery as a percentage of pore volume was plotted against the volume of the injected fluids. FIG. 8 is a graph showing the oil recovery percent as a function of water flooring and surfactant flooding volume Since the glass microfluidic chip can be reused for many tests, after each test the chip is cleaned using solvents such as toluene, isopropanol, acetone, and water. Although these solvents clean most of the oil residue, surfactant, and salts from porous media, over time there may be some impurities built up that is difficult to remove with these solvents. This results in wettability changes from the original glass surface. To dissolve such residue and better control wettability in microfluidic porous media, at the end of the cleaning step the microfluidic media surface can be treated with an acid such as sulfuric acid, optionally together with a detergent, followed by water and a base to neutralize the residual acid. (also referred to as "acid treatment") One specific acid treatment includes washing the porous media with 1 ml of acid containing 2% Nochromix (detergent) in 25% sulfuric acid, followed by fresh DI water and 3% KOH to neutralize the treatment.

Oil recovery results after water flooding from the porous media with and without acid treatment are compared. The data shows that without acid treatment, 42-62.5% oil was recovered from initial water flooding, showing about 20% of variation in oil recovery from seven tests conducted under the same conditions. On the other hand, the tests done in the porous media cleaned with acid showed 50-61.7% oil recovery from initial water flooding, showing only 11.7% variation in oil recovery from five tests conducted under the same conditions. By cleaning the porous media with acid, the initial oil recovery from initial water flooding became twice as consistent.

To better interpret the data, the surfactant/polymer performance effectiveness can be calculated considering the amount of residual oil after initial water flooding and the total oil recovery from each test as follows:

[Active component performance effectiveness (%)]= [FOR−IOR]/[MOR−IOR]×100, where FOR is final oil recovery %, IOR is initial oil recovery % from initial water/brine flooding, MOR is Max oil recovery expected (normally 80% seems to be max in MARI (Microfluidic Apparatus for Recovery Improvement), sand pack, and core flood testing). In this equation, surfactant effectiveness is calculated not only based on the net oil recovery % through active components such as surfactants but also based on the recovery potential of the porous media by taking the amount of residual oil stored into account. The equation allows for a reliable and consistent evaluation of active components in improving oil recovery.

Illustrative results are shown in Table 1.

TABLE 1

| Surfactant | Repeat | IFT (mN/m) | Category based on IFT & oil recovery result | Total Oil Recovery (%) | Oil Recovery solely from surfactant and the following additional water flooding (%) | Performance effectiveness Indicator (%) Individual test | Performance effectiveness Indicator (%) Averaged value |
|---|---|---|---|---|---|---|---|
| # 1 | 1 | ~$10^{-3}$ | Good surfactant | 76.3 | 20.3 | 84.6 | 84.6 (Good) |
| # 2 | 1 | ~$10^{-2}$ | Good surfactant | 73.1 | 40.9 | 85.6 | 78.2 (Good) |
|  | 2 |  |  | 73.1 | 21.5 | 75.7 |  |
|  | 3 |  |  | 74.5 | 15.1 | 73.3 |  |
| # 3 | 1 | ~$10^{-1}$ | Mid performance | 63.1 | 10.2 | 37.6 | 37.6 (Mid) |
| # 4 | 1 | ~7 | Poor performance | 41.9 | 0.7 | 1.8 | 7.0 (Poor) |

*IFT: interfacial tension

The experimental results confirmed that the developed system can differentiate oil recovery performance among good, average and poorly performing surfactants.

Figure 9:
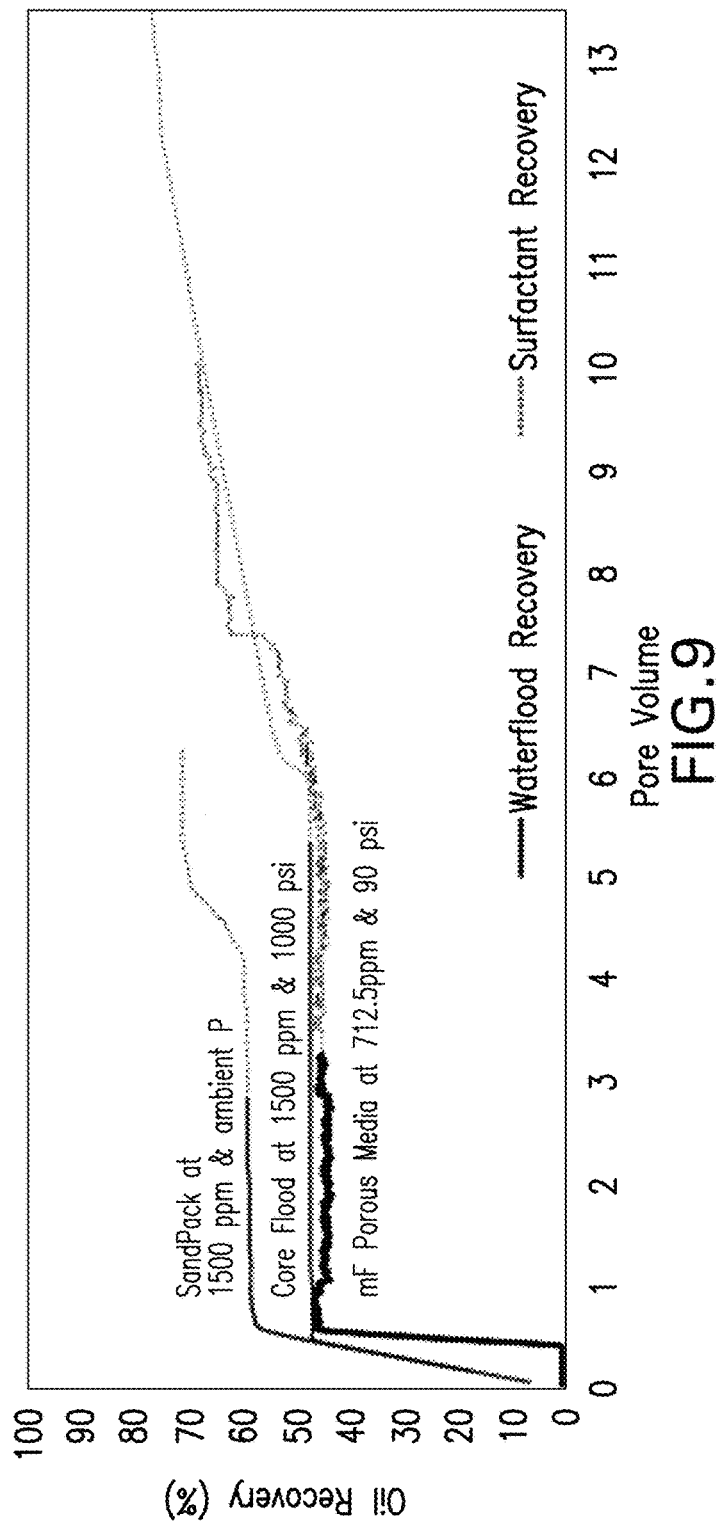
FIG. 9 is a graph comparing the results obtained from sand pack testing, core flood testing, and a microscale fluid channel testing.

FIG. 9 is a graph comparing the results obtained from sand pack testing, core flood testing, and microfluidic porous media testing. The results show that the data produced through microfluidic porous media is similar to those obtained from conventional core flood and sand pack tests. For the same testing, sand pack method's turnaround time was five days. The turnaround time for core flood method was one month, whereas the turnaround time for microfluidic porous media testing was about three days. Accordingly comparable test results are obtained with less time, labor, and lab space. The method can be even more efficient when multiple fluids are tested simultaneously using four or more microfluidic porous medias at the same time.

All ranges disclosed herein are inclusive of the endpoints, and the endpoints are independently combinable with each other. As used herein, "combination" is inclusive of blends, mixtures, alloys, reaction products, and the like. All references are incorporated herein by reference in their entirety.

Set forth are various embodiments of the disclosure.

Embodiment 1. A method of screening a plurality of fluids for an effectiveness in enhancing oil recovery, the method comprising: introducing a petroleum hydrocarbon into a plurality of separate fluid channels to saturate the fluid channels, each of the fluid channels having a porous structure configured to represent a condition of an earth formation; injecting a plurality of aqueous based fluids into the fluid channels; imaging the fluid channels to provide a plurality of images; analyzing the images to determine an amount of the petroleum hydrocarbon remains in the fluid channels after injection of the aqueous based fluids; and determining an effectiveness of the aqueous based fluids in forcing the petroleum hydrocarbon out of the fluid channels.

Embodiment 2. The method as in any prior embodiment, further comprising aging the petroleum hydrocarbon in the fluid channels at an elevated temperature.

Embodiment 3. The method as in any prior embodiment, further comprising injecting water or a brine into the fluid channels before injecting the aqueous based fluids.

Embodiment 4. The method as in any prior embodiment, wherein the aqueous based fluids contain a surfactant, a polymer that is effective to mobilize the petroleum hydrocarbon, or a combination comprising at least one of the foregoing.

Embodiment 5. The method as in any prior embodiment, wherein the aqueous based fluids further comprise a co-surfactant, an organic solvent, a co-solvent, a diluent, or a combination comprising at least one of the foregoing.

Embodiment 6. The method as in any prior embodiment, wherein injecting the aqueous based fluids into the fluid channels comprises injecting a different aqueous based fluid into each of the plurality of the fluid channels.

Embodiment 7. The method as in any prior embodiment, wherein at least one variable of the aqueous based fluids changes across the plurality of the aqueous based fluids.

Embodiment 8. The method as in any prior embodiment, wherein the variable comprises a concentration of an active component, a composition of a brine, an injection volume of the aqueous based fluids, or a flow rate of the aqueous based fluids.

Embodiment 9. The method as in any prior embodiment, wherein determining an effectiveness of the aqueous based fluids in enhancing oil recovery is based on the equation:

Efficiency%=[FOR−IOR]/[MOR−IOR]×100, wherein FOR is a final oil recovery percent; IOR is an initial oil recovery percent from initial water or brine injection; and MOR is an expected oil recovery percent.

Embodiment 10. The method as in any prior embodiment, wherein the method screens at least four or more samples at a time.

Embodiment 11. The method as in any prior embodiment, wherein each of the fluid channels has a separate inlet and outlet.

Embodiment 12. The method as in any prior embodiment, wherein the fluid channels are microscale channels having at least one cross-sectional channel dimension of about 1 micron to about 500 microns.

Embodiment 13. The method as in any prior embodiment, wherein each of the fluid channels has the same porous structure.

Embodiment 14. The method as in any prior embodiment, wherein the fluid channels have different porous structures.

Embodiment 15. The method as in any prior embodiment, wherein the fluid channels are made of a transparent material.

Embodiment 16. A system for screening a plurality of fluids for an effectiveness in enhancing oil recovery, the system comprising: a plurality of separate fluid channels, each of the fluid channels having a porous structure configured to represent a condition of an earth formation, and each of the fluid channels having a separate inlet and outlet; at least one injection device configured to inject a plurality of fluids into the fluid channels; at least one back pressure regulator coupled to the fluid channels; at least one imaging device configured to image the fluid channels; and a processing unit configured to determine an amount of the fluids in the fluid channels based on the images.

Embodiment 17. The system as in any prior embodiment further comprising a housing having a plurality of cavities that accommodate the fluid channels.

Embodiment 18. The system as in any prior embodiment, wherein the housing is a hotplate adaptor.

Embodiment 19. The system as in any prior embodiment, wherein each of the fluid channels is coupled to a separate back pressure regulator.

Embodiment 20. The system as in any prior embodiment, comprising a plurality of imaging devices configured to image each of the fluid channels separately.

Embodiment 21. The system as in any prior embodiment, wherein each of the plurality of the fluids is an aqueous based fluid containing a surfactant, a polymer that is effective to mobilize the petroleum hydrocarbon, or a combination comprising at least one of the foregoing.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." The modifier "about" used in connection with a quantity is inclusive of the stated value and has the meaning dictated by the context (e.g., it includes the degree of error associated with measurement of the particular quantity). As used herein, water flooding includes brine flooding.

The invention claimed is:

1. A method of screening a plurality of fluids for an effectiveness in enhancing oil recovery, the method comprising:
introducing a petroleum hydrocarbon into a plurality of separate fluid channels to saturate the fluid channels, each of the fluid channels having a porous structure configured to represent a condition of an earth formation;
injecting a plurality of aqueous based fluids into the fluid channels;
imaging the fluid channels to provide a plurality of images;
analyzing the images to determine amounts of the petroleum hydrocarbon remain in the fluid channels after injection of the aqueous based fluids; and
determining an effectiveness of the aqueous based fluids in forcing the petroleum hydrocarbon out of the fluid channels,
wherein the method further comprises aging the petroleum hydrocarbon in the fluid channels at an elevated temperature.

2. The method of claim 1, further comprising injecting water or a brine into the fluid channels before injecting the aqueous based fluids.

3. The method of claim 2, wherein the aqueous based fluids contains a surfactant, a polymer that is effective to mobilize the petroleum hydrocarbon, or a combination comprising at least one of the foregoing.

4. The method of claim 3, wherein the aqueous based fluids further comprises an organic solvent.

5. The method of claim 2, wherein injecting the aqueous based fluids into the fluid channels comprises injecting a different aqueous based fluid into each of the plurality of the fluid channels.

6. The method of claim 5, wherein at least one variable of the aqueous based fluids changes across the plurality of the aqueous based fluids; and the variable comprises a concentration of an active component, a composition of an active component, an injection volume of the aqueous based fluids, or a flow rate of the aqueous based fluids.

7. The method of claim 1, wherein the method screens at least four or more samples at a time.

8. The method of claim 1, wherein each of the fluid channels has a separate inlet and outlet.

9. The method of claim 1, wherein the fluid channels are microscale channels having at least one cross-sectional channel dimension of about 1 micron to about 500 microns.

10. The method of claim 1, wherein each of the fluid channels has the same porous structure.

11. The method of claim 1, wherein the fluid channels have different porous structures.

12. The method of claim 1, wherein the fluid channels are made of a transparent material.

13. A method of screening a plurality of fluids for an effectiveness in enhancing oil recovery, the method comprising:
introducing a petroleum hydrocarbon into a plurality of separate fluid channels to saturate the fluid channels, each of the fluid channels having a porous structure configured to represent a condition of an earth formation;
injecting a plurality of aqueous based fluids into the fluid channels;
imaging the fluid channels to provide a plurality of images;
analyzing the images to determine amounts of the petroleum hydrocarbon remain in the fluid channels after injection of the aqueous based fluids; and
determining an effectiveness of the aqueous based fluids in forcing the petroleum hydrocarbon out of the fluid channels,
wherein determining an effectiveness of the aqueous based fluids in enhancing oil recovery is based on the equation:

$$\text{Efficiency}\% = [\text{FOR} - \text{IOR}]/[\text{MOR} - \text{IOR}] \times 100,$$

wherein FOR is a final oil recovery percent;
IOR is an initial oil recovery percent from initial water or brine injection; and
MOR is an expected oil recovery percent.

14. A system for screening a plurality of fluids for an effectiveness in enhancing oil recovery, the system comprising:
a plurality of separate fluid channels, each of the fluid channels having a porous structure configured to represent a condition of an earth formation, and each of the fluid channels having a separate inlet and outlet;

at least one injection device configured to inject a plurality of fluids into the fluid channels;
at least one back pressure regulator coupled to the fluid channels;
at least one imaging device configured to image the fluid channels; and
a processing unit configured to determine amounts of fluids in the fluid channels based on the images,
wherein the system further comprises a housing having a plurality of cavities that accommodate the fluid channels, and the housing is a hotplate adaptor.

15. The system of claim 14, wherein each of the fluid channels is coupled to a separate back pressure regulator.

16. The system of claim 14, comprising a plurality of imaging devices configured to image each of the fluid channels separately.

* * * * *